UNITED STATES PATENT OFFICE.

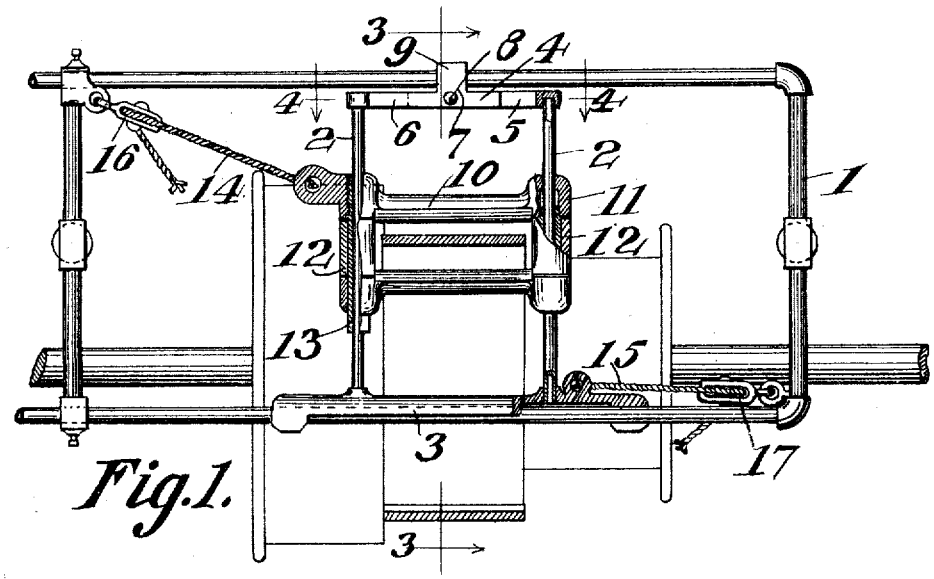
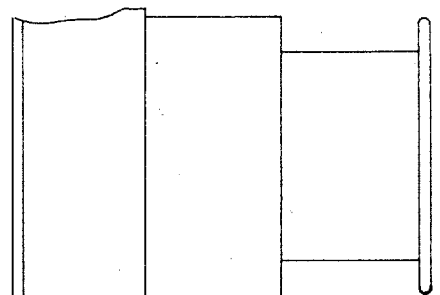
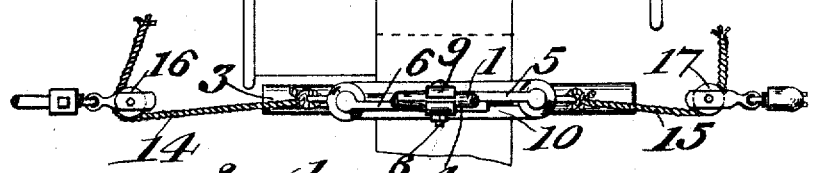
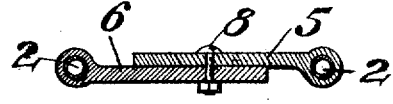

JAMES A. LONG, OF PORTLAND, OREGON, ASSIGNOR OF ONE-THIRD TO ERNEST E. BOGGESS.

BELT-SHIFTER.

942,384.

Specification of Letters Patent.

Patented Dec. 7, 1909.

Application filed July 17, 1908. Serial No. 444,066.

*To all whom it may concern:*

Be it known that I, JAMES A. LONG, a citizen of the United States, residing at Portland, in the county of Multnomah and State of Oregon, have invented certain new and useful Improvements in Belt-Shifters; and I do declare the following to be a full, clear, and exact description of the invention, such as will enable others skilled in the art to which it appertains to make and use the same.

My invention relates to improvements in belt shifters.

It has for its object to guard against accident to the attendant in shifting the driving belt, more particularly upon stepped or cone pulleys. Also, to dispense with improvised means or make-shifts for effecting the shifting of the belt; and to carry out these ends in a simple, economic and effective manner.

With these and other objects in view, the invention consists of certain novel features of construction, combination and arrangement of parts as will be described and particularly pointed out in the appended claims.

In the accompanying drawings, illustrating the preferred embodiment of my invention, Figure 1 is a broken side elevation thereof; Fig. 2 is a plan view thereof; Fig. 3 is a vertical sectional view of the same produced on the line 3—3 of Fig. 1; and Fig. 4 is a detailed sectional view taken on the line 4—4 of Fig. 1.

In carrying out my invention, I employ a suitable frame 1, preferably rectangular in general outline, and suitably supported by means of counter-shaft hangers or other independent supporting means. Arranged upon this frame is a second frame, 2, also preferably rectangular in general contour, and having its end or supporting member, 3, slidably supported upon the lower member of the frame, 1. Said frame 2 has its upper end composed of sections, 5 and 6 which have screw threaded sockets to receive the vertical bars 4 of the frame 2, and with their inner ends adapted to lap each other and be clamped together by means of a bolt, 8, passing therethrough adjacent the inner ends of the sections. Upward extensions, 9, integral with the sections are provided adapted to embrace the upper member or bar of the frame 1, so as to permit frame 2 to slide upon the frame.

Slidably mounted on the frame 2 is a pair of arms comprising the horizontal members of the belt frame. These arms have threaded apertures at their ends to receive the tubular connecting members 13 which surround the rods and serve to guide the frame thereon as will be hereinafter described. The tubular connecting members 13 also serve as bearings for the belt rollers 12 which are journaled thereon in between the ends of the upper and lower arms of the frame, the latter acting as thrust bearings for the rollers. In the drawing the right hand tube 13 is concealed by the end of the lower arm but the left hand tube 13 is extended freely through and below the lower arm where it may be engaged by any suitable tool to disengage it from the upper arm whereby the left hand roller may be moved and the belt may be disengaged from the frame 10. In this connection it is also noted that in order to effect the removal of the frame 2, from the frame 1, as in applying the frame 2 to the driving belt when in the position last noted, the upper connecting member of the frame 2 is also detached from said frame 2. For effecting the latter purpose the sections are displaced by withdrawing their connecting bolt, 8, and then suitably unscrewing the sections, 5 and 6 from the frame 2, as will be readily appreciated.

To the frame 10 and the frame 2 are applied manipulating ropes, or lines, 14 and 15, respectively, suitably supported in position upon pulleys or rolls, 16 and 17, for the purpose of suitably moving said frames as in adjusting or applying the belt to any one of the steps or diameters of the pulley or cone, as will be, it is thought, readily apparent, especially from Fig. 2 of the drawing. Said frame, 2, has longitudinal movement and the frame 10 has vertical movement for accommodating the aforesaid application of said belt to the steps of the pulley or cone. It will, therefore, be seen from the foregoing arrangement and combination of parts that the belt shifting operation is readily and conveniently effected by the attendant without liability of being involved with the belts or pulleys, as heretofore has been experienced in performing the belt shifting operation in the usual way; and that it is not required to employ make shifts or improvised means for effecting that purpose.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:—

1. A step cone belt shifter comprising a supporting frame, a support horizontally slidable thereon, a belt frame carried on said support, and means for simultaneously moving said belt frame horizontally and vertically to positively shift the belt to smaller or larger steps.

2. A step cone belt shifter comprising a supporting frame, a support thereon, a belt frame surrounding the belt and sliding on the support, and means to simultaneously move the belt frame laterally and vertically to positively shift the belt to smaller or larger steps.

3. A step cone belt shifter comprising a supporting frame, a belt frame support horizontally slidable thereon, a belt frame removably carried by said support and adapted to removably surround the belt whereby the belt may be removed from the frame, and means to simultaneously move the belt frame laterally and vertically to positively shift the belt to smaller or larger steps.

4. In a device of the class described, the combination with a frame, of a separable support, horizontally slidably mounted on the frame, a separable belt frame slidably mounted on said support and adapted to removably surround the belt whereby the belt may be disengaged from the frame, and means whereby the belt frame is simultaneously moved laterally and vertically to positively shift the belt to smaller or larger steps.

In testimony whereof I have hereunto set my hand in presence of two subscribing witnesses.

JAMES A. LONG.

Witnesses:
  D. MILLER,
  R. I. YOUNG.